Figure 1:
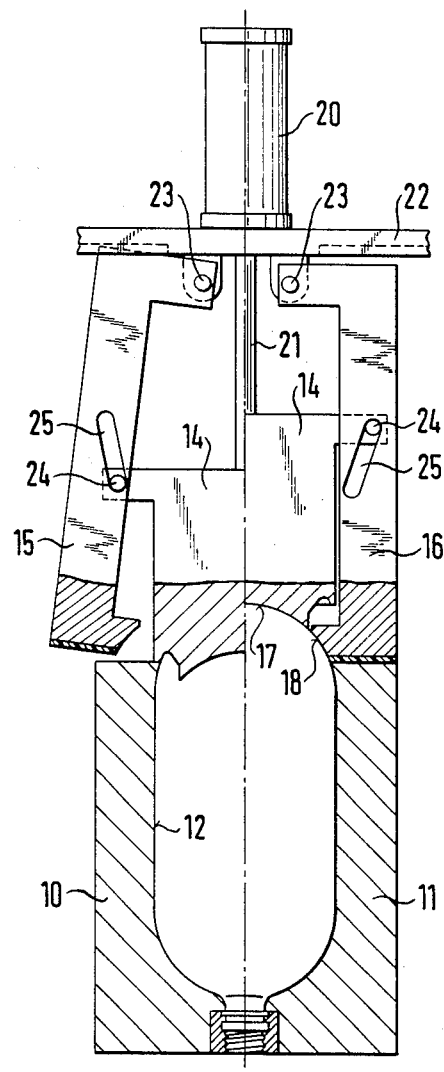

United States Patent [19]

Reymann et al.

[11] Patent Number: 4,769,206
[45] Date of Patent: Sep. 6, 1988

[54] METHOD FOR PRODUCING A HOLLOW BODY PROVIDED WITH A STAND RING BY BLOW MOULDING

[75] Inventors: Wolfgang Reymann; Günter Kleimenhagen, both of Hamburg, Fed. Rep. of Germany

[73] Assignee: Krupp Corpoplast Maschienebau GmbH, Fed. Rep. of Germany

[21] Appl. No.: 937,344

[22] Filed: Dec. 3, 1986

[30] Foreign Application Priority Data
Dec. 5, 1985 [DE] Fed. Rep. of Germany ....... 3543082

[51] Int. Cl.⁴ ..................... B29C 49/16; B29C 49/30
[52] U.S. Cl. .................................... 264/534; 425/525
[58] Field of Search ............... 264/534, 296, 530; 425/525, 450.1, 451.4, 451.5, 451.9, DIG. 5

[56] References Cited

U.S. PATENT DOCUMENTS

| | | |
|---|---|---|
| 3,949,033 | 4/1976 | Uhlig . |
| 4,035,461 | 7/1977 | Korth .................................. 264/296 |
| 4,120,927 | 10/1978 | Nielsen ................................ 264/534 |

Primary Examiner—Jan H. Silbaugh
Assistant Examiner—Neil M. McCarthy
Attorney, Agent, or Firm—Dickey & Pierce Harness.

[57] ABSTRACT

In a blow mould firstly a convexly formed bottom is blown. An intermediate region lying between an axially displaceable bottom mould and the blow mould bears on mould portions which on introduction of the bottom mould are pivoted back for turning back the bottom region to form a stand ring and release the path for the bottom mould which is finally positioned on the blow mould so that a closed mould cavity is formed on which the transformed bottom region can be reliably applied by blow pressure.

6 Claims, 4 Drawing Sheets

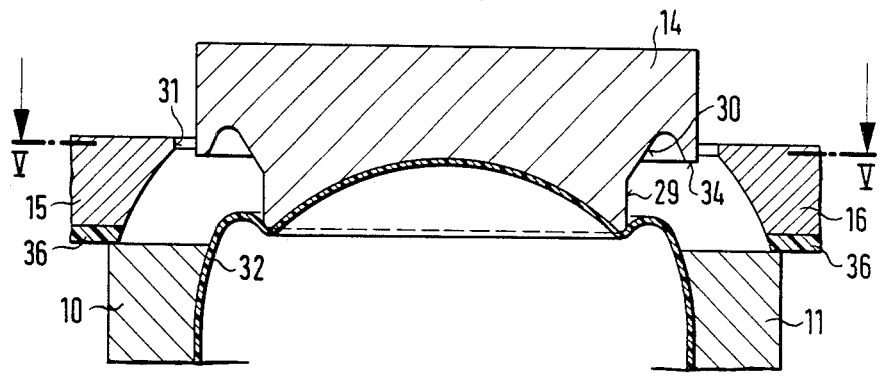
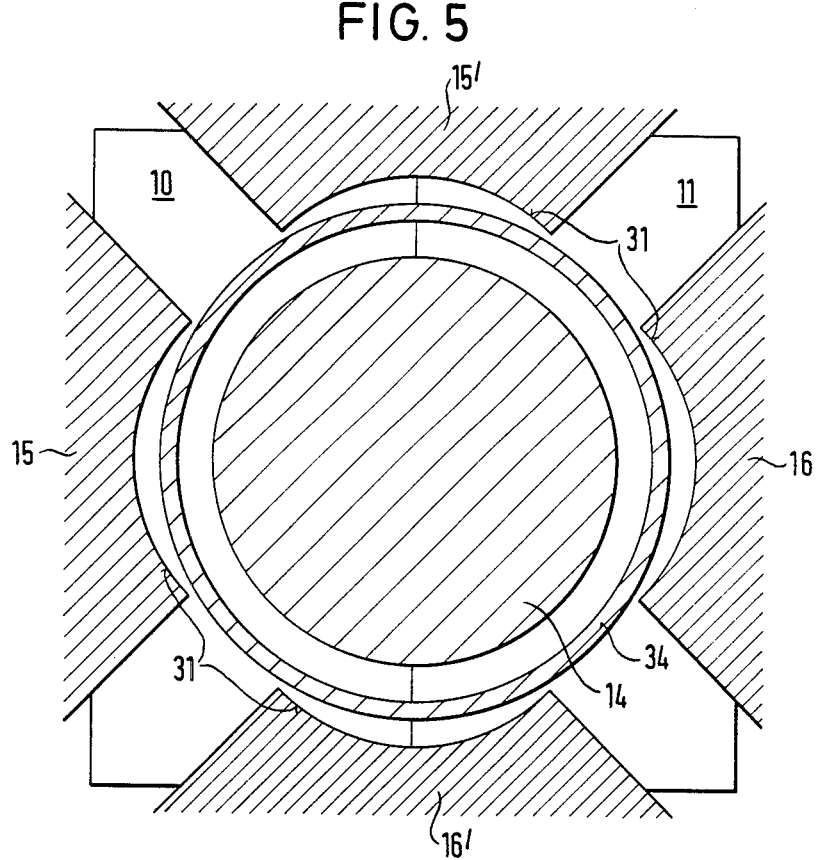

METHOD FOR PRODUCING A HOLLOW BODY PROVIDED WITH A STAND RING BY BLOW MOULDING

The invention relates to a method and an apparatus for producing a hollow body provided with a stand ring by blow moulding having the features set forth in the preamble of claim 1.

In the production of an internally pressure-resistant bottle by blow moulding the forming of the bottom represents a particular problem unless the hollow body is made with a spherical bottom and the latter is inserted into a bottom cup to obtain the stability.

To form a stand or base ring in the form of a foot portion on a container it is known from German Document (DE-AS No. 1,479,563) to extrude a hose-like preform into a blowing mould having an axially displaceable bottom mould portion divided into two parts which compresses the end of the preform by means of the halves of the bottom mould portion. The wall thickness in the bottom region cannot be optimized. In the subsequent blowing operation in the region of the support face of the stand ring to be formed a radially outwardly directed annular bead is formed. Thereafter the bottom form portion is displaced axially inwardly, turning in the container bottom. The ring bead in the support face of the stand ring is transformed. Since the diameter of the side wall of the container must be greater than the diameter of the turned-in container bottom on introduction of the bottom mould portion an annular region results in which the preform under pressure is not supported. As a result the stand ring can be given an irregular form or rupture.

It is also known from German Document No. (P 22 22 535) in a blowing mould provided with a bottom ram to blow up a preform which is provided with a closed bottom and the bottom part of which on the free blowing up is intercepted by the convexly formed bottom ram and in the subsequent movement of the bottom ram folded back inwardly and transformed. This is a blowing operation which is very difficult to control.

In another known method as disclosed in German Document (P 24 44 700) a preform having a convex bottom is first blown in a preblowing mould, an annular bead being formed on a region associated with the support face of the stand ring, whereupon the blowing up to form the container is carried out in a second blowing mould in which with the aid of an axially displaceable bottom mould portion the bottom part and the stand ring are made. Thus, in this case a preblowing station is necessary.

The problem underlying the invention is to be seen in providing a method with which on a container to be blow moulded a bottom part can be formed in simple manner which as regards strength and wall thickness is optimum and the disadvantages outlined at the beginning are avoided. An object of the invention is also to provide an apparatus for carrying out the method.

The problem is solved according to the invention by the method features set forth in the characterizing clause of claim 1. Further developments will be apparent from the subsidiary claims. The claims also set forth an apparatus according to the invention for carrying out the method.

The invention proceeds on the basis that firstly in a blowing mould a spherically formed bottom is blown so that the wall thickness distribution can be optimized in this manner and the maximum possible strength obtained. As is known, in blowing PET in this manner it is possible to produce a bottom which has a uniform wall thickness and thus a minmum weight.

The spherical bottom region is now divided into three concentric regions:

1. An outer region which is to be considered as a continuation of the usually cylindrical form of the hollow body and extends up to the stand ring,
2. a centre subsequently turned-back region and
3. an inner spherically formed region which subsequently only changes its position by displacement along the longitudinal axis of the bottle.

It is thus possible in a single blowing mould following the blowing of the bottom part to form the stand ring and turn in the bottom portion. This enables the production method to be simplified and the quality of the product increased. A particular advantage also resides in that after completion of the turning back operation once again a closed mould is present and by increased internal pressure in the hollow body the material in the region to be folded back can be applied to the closed mould. As a result the stand ring is cleanly formed without any unsupported regions being present at which the material could rupture.

An example of embodiment of the invention will be explained in detail hereinafter with the aid of the drawings, wherein:

FIG. 1 shows a longitudinal section through a blowing mould having an axially displaceable bottom mould and multipart mould portions, FIGS. 2–6 show a schematic representation of the movement cycles for forming a stand ring on a bottle.

In FIG. 1 two blowing mould halves are denoted by 10 and 11 and are open and closed in known manner by a drive which is not illustrated, i.e. are movable away from each other and towards each other. The inner wall 12 of the blowing mould halves defines the contour of a mould cavity for the mouth region, the adjoining neck region and the adjoining wall region of a bottle to be moulded, said region being cylindrical in the example of embodiment. A blow mandrel which is not illustrated is introduced from below through the mouth region of the bottle into the mould cavity.

The contour 12 of the mould cavity within the bottom region is formed by a bottom mould 14 and a plurality of segment-shaped mould portions 15 and 16. The contours 17 and 18 on the inner wall of the bottom mould 14 and of the mould portions 15 and 16 facing the mould cavity are convexly curved and in the example of embodiment are semicircular in cross-section so that the container to be blown is given a spherical bottom part when the bottom mould 14 and the mould portions 15 and 16 are in the position illustrated on the right half of FIG. 1.

From this position the bottom mould 14 is adapted to be displaced downwardly into the position illustrated on the left half of FIG. 1 in which the bottom mould 14 is positioned on the blowing mould halves 10 and 11 and once again forms a closed mould cavity. For driving the bottom mould a cylinder 20 is provided via the piston rod 21 of which the bottom mould 14 is displaceable. On a housing plate 22 carrying the cylinder 20 at 23 the mould portion 15 and 16 are respectively pivotally disposed. A cam 24 secured to the bottom mould 14 engages into a cam track 25 of each mould portion 15 and 16 respectively. Consequently, on displacement of the bottom mould 14 each mould portion 15, 16 is driven and is thus pivotal between two positions. In the position on the right each mould portion is retracted while in the position shown on the left the mould portions are pivoted outwardly.

Figure 2:
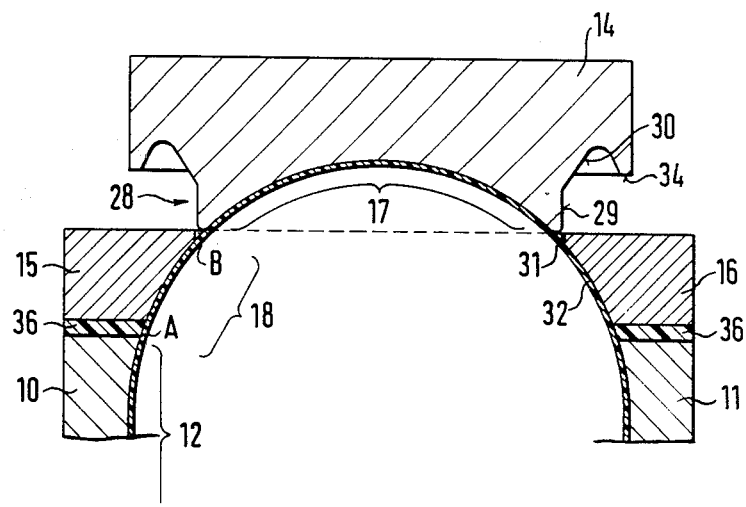

In FIG. 2 as in the following illustrations only partial sections through the bottom mould 14, the mould portions 15, 16 and the blowing mould halves 10 and 11 are shown to a larger scale.

It is apparent in detail from FIG. 2 that the region 12 of the mould cavity extends up to the upper end of the blowing mould halves 10, 11. This region is to be regarded as continuation of the cylindrical bottle form and extends approximately up to the subsequent stand or base ring. The centre region 18 formed by the mould portions 15, 16 is subsequently turned back. The inner region 17 formed on the bottom mould 14 is inwardly displaced during the turning back of the region 18 without changing its form.

The bottom mould 14 comprises apart from the inner portion 17 an outer portion 28 which in particular consists of a cylindrical portion 29 and an adjoining contour 30 which is part of the stand ring. The diameter of the cylindrical portion 29 is so selected that the bottom mould 14 in the closed state of the mould portions 15, 16 can extend through the upper opening 31 thereof.

Figure 3:
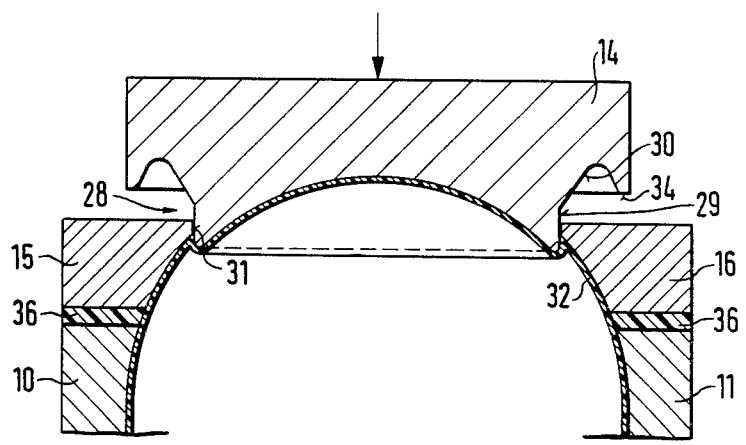

This condition is shown in FIG. 3. The transforming or reshaping thus starts at a position, exactly defined by the cylindrical portion 29 and the opening 31, in the spherical bottom part 32 of the blow-moulded bottle. Thereafter the mould portions 15, 16 must be pivoted outwardly to free the path for the further entering bottom mould 14.

This is shown in FIG. 4 in which the mould portions 15 and 16 are retracted. The bottle bottom 32 remains fixed to the bottom mould 14, i.e. cannot change its position with respect to the bottom mould and the blowing mould halves 10 and 11.

A section along the line V—V is shown in FIG. 5. A total of four mould portions 15 and 16 and 15′ and 16′ are present which in the manner illustrated in FIG. 1 are mechanically coupled to the bottom mould 14. In FIGS. 4 and 5 the edge positioned on the blowing mould halves 10 and 11 in the end location of the bottom mould 14 is denoted by 34.

Figure 6:
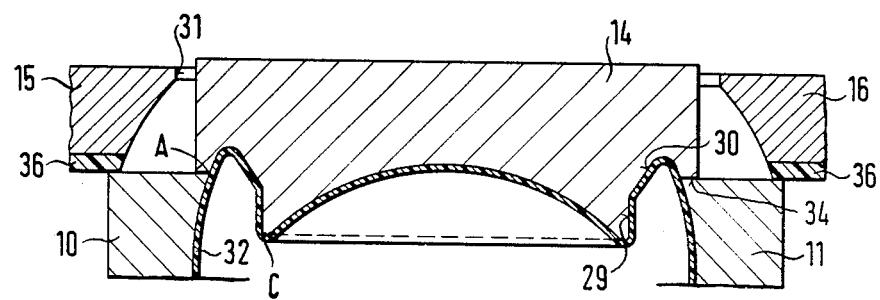

In FIG. 6 the stroke of the bottom mould 14 is concluded, the edge 34 thereof being positioned on the blowing mould halve 10 and 11. A closed mould cavity is thus formed. Thereafter it is possible to introduce an increased blowing pressure into the container interior which substantially only further brings the turned-back bottom region into reliable engagement on the outer region 29, 30 of the bottom mould 14.

The blowing mould halves 10 and 11 are cooled in known manner. The mould portions 15, 16 are heatable or made from material having a poor thermal conductivity. Between the mould portions and the blowing mould halves an insulating layer 36 is provided. In the example of embodiment the insulating layer 36 is secured to the mould portions. The bottom mould 14 is again cooled.

The blowing operation is as follows: firstly, the spherical bottom region 32 is blown according to FIG. 2. The time sequence of the blowing operation is not critical because in any case blowing is continued until the forming is certainly finished. The cooling starts in the region 12 and 17 of the cooled moulds. On engagement in the region 18 of the mould portions 15 and 16 however the warm state of the plastic is retained. The mould portions 15 and 16 may also be subsequently heated to maintain the plasticity.

During the transforming operation illustrated in FIG. 3 and in particular in FIG. 4 the turning back movement takes place as rapidly as possible to prevent the unsupported wall regions being deformed in undesirable manner under the action of the pressure acting in the container interior. As apparent in particular from FIG. 5 the extent of the flushness which can be achieved between the bottom mould and the form portions depends on the number of segments of the mould portions. In FIG. 5 four segments are illustrated which can b increased to six segments. To avoid an excessively large number of segments the turning over operation should thus be carried out as rapidly as possible. It is also possible to reduce the internal pressure during the operation and/or briefly interrupt the pressure supply of blowing air.

Once the end position according to FIG. 6 is reached the blowing pressure can be increased in order to finally apply the stand ring, in the region of which the material is still warm, to the cold bottom mould 14.

If the longitudinal fibres of the plastic material in the turned-back region are to undergo a certain minimum stretching during the turning back operation the geometry of the moulds may be configured in the manner indicated in FIGS. 2 and 6. In accordance with FIG. 2 the length of the region 18, i.e. the length between the points A and B, is less than the length of the bottom region between the points A and C in FIG. 6. As a result a stretching of the material in the longitudinal direction takes place in the turning back operation.

In addition, to make relatively large containers the mould portions 15, 16 may be divided into a plurality of layers which are adapted to be retracted or pivoted out successively. A division of the segment-shaped mould portions is thus made in the axial direction of the bottom.

If it is desired to increase the compressive strength of the stand ring in the region of the two radii which adjoin the turned-back region the annular contour of the bottom mould 14 may be interrupted by depressions which are not illustrated and thus stiffened. Foot-like widenings are thus formed in the region of the stand ring.

We claim:

1. Method of producing a hollow body provided with a stand ring by blow moulding a preform having a closed bottom and comprising thermoplastic plastic in which firstly the hollow body is blow moulded with a substantially outwardly arched bottom, whereupon the bottom is inwardly displaced by turning back a bottom region to form the stand ring by means of an axially movable bottom mould, characterized in that a first axially movable mould portion forms a center of the outwardly arched bottom and second removable mould portions cooperate with the first mold portion to form an outer part of said outwardly arched bottom, blowing said preform into engagement with said first and second mould portions when said first portion is in a first axial position and said second mould portions are in place to form said outwardly arched bottom, outwardly removing said second mould portions and axially moving said first mould portion to turn back the bottom region to form the stand ring.

2. Method according to claim 1, characterized in that the hollow body is supported with compressed air in the container interior when the first mould portion is moved axially to form the stand ring.

3. Method according to claim 1 characterized in that the first mould portion has an area exposed to the hollow body when the second mould portion is removed and the turned-back region is applied to the first mould portion area under an increased internal pressure.

4. Method according to claim 1 characterized in that the region to be turned back is kept soft by means of said first axially movable mould portion.

5. Method according to claim 1 characterized in that beads are formed in the region of the stand ring.

6. The method as set forth in claim 1 wherein the second mould portions comprise a plurality of segments moveable radially relative to the first mould portion.

* * * * *